(12) United States Patent
Nakao

(10) Patent No.: US 9,010,383 B2
(45) Date of Patent: Apr. 21, 2015

(54) CAP UNIT FOR A TIRE PUNCTURE REPAIR APPARATUS

(75) Inventor: Yukio Nakao, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 383 days.

(21) Appl. No.: 13/578,737

(22) PCT Filed: Feb. 9, 2011

(86) PCT No.: PCT/JP2011/052773
§ 371 (c)(1),
(2), (4) Date: Aug. 13, 2012

(87) PCT Pub. No.: WO2011/111463
PCT Pub. Date: Sep. 15, 2011

(65) Prior Publication Data
US 2012/0298255 A1    Nov. 29, 2012

(30) Foreign Application Priority Data

Mar. 12, 2010 (JP) .................................. 2010-056303
Mar. 16, 2010 (JP) .................................. 2010-059629

(51) Int. Cl.
*B29C 73/16* (2006.01)
*B29L 30/00* (2006.01)

(52) U.S. Cl.
CPC ........... *B29C 73/166* (2013.01); *B29L 2030/00* (2013.01)

(58) Field of Classification Search
CPC ......................... B23C 73/166; B29L 2030/00
USPC .......... 141/9, 38, 100, 105, 329, 330; 251/15, 251/20, 21
See application file for complete search history.

(56) References Cited

U.S. PATENT DOCUMENTS

| | | | | |
|---|---|---|---|---|
| 3,318,346 A | * | 5/1967 | Wolfgang | 141/293 |
| 3,506,241 A | * | 4/1970 | Ewald | 251/354 |
| 4,489,855 A | * | 12/1984 | Boetger | 222/5 |
| 5,345,980 A | * | 9/1994 | Burt et al. | 141/3 |
| 5,472,023 A | * | 12/1995 | Fogal et al. | 141/9 |
| 5,544,670 A | * | 8/1996 | Phillips et al. | 137/224 |
| 5,590,696 A | * | 1/1997 | Phillips et al. | 141/47 |

(Continued)

FOREIGN PATENT DOCUMENTS

| | | |
|---|---|---|
| JP | 2006-007660 A | 1/2006 |
| JP | 2007-076003 A | 3/2007 |

(Continued)

*Primary Examiner* — Timothy L Maust
*Assistant Examiner* — Andrew StClair
(74) *Attorney, Agent, or Firm* — Birch, Stewart, Kolasch & Birch, LLP

(57) ABSTRACT

Disclosed is a cap unit wherein safety is increased by preventing a reversed flow of a puncture-sealing agent. A cap main body (33) comprises an air flow passage (31) consisting of a vertical flow passage (31A) extending downward from an air passage upper opening (31a), a lateral flow passage (31B) laterally extending from an air intake port (31b), and a connecting flow passage (31C) connecting therebetween. The air flow passage (31) is provided with a reversed flow preventing device (22). The cap main body (33) is provided with a vertical hole (40) consisting of first to fourth vertical holes (40A to 40D) which have inner diameters increasing downwardly from the upper end in a stepwise manner, and the first to third vertical holes (40A to 40C) form the vertical flow passage (31A).

5 Claims, 13 Drawing Sheets

(56) References Cited

U.S. PATENT DOCUMENTS

| | | | |
|---|---|---|---|
| 6,431,225 B1* | 8/2002 | Dudley | 141/38 |
| 6,648,027 B1* | 11/2003 | Didur | 141/38 |
| 6,736,170 B2* | 5/2004 | Eriksen et al. | 141/38 |
| 7,178,564 B2* | 2/2007 | Kojima et al. | 141/38 |
| 7,798,183 B2* | 9/2010 | Cegelski et al. | 141/38 |
| 8,336,581 B2* | 12/2012 | Lolli et al. | 141/38 |
| 8,453,684 B2* | 6/2013 | Lolli | 141/38 |
| 8,640,744 B2* | 2/2014 | Dowel | 141/38 |
| 8,640,919 B2* | 2/2014 | Lambrecht | 222/82 |
| 8,857,477 B2* | 10/2014 | Lolli et al. | 141/38 |
| 2005/0191193 A1* | 9/2005 | Chou | 417/437 |
| 2005/0284536 A1 | 12/2005 | Kojima et al. | |
| 2008/0230142 A1* | 9/2008 | Hickman | 141/38 |
| 2009/0107578 A1* | 4/2009 | Trachtenberg et al. | 141/5 |
| 2013/0048146 A1* | 2/2013 | Eckhardt | 141/38 |
| 2013/0105055 A1* | 5/2013 | Chou | 152/416 |
| 2013/0199666 A1* | 8/2013 | Nakao et al. | 141/38 |
| 2013/0284312 A1* | 10/2013 | Chou | 141/38 |
| 2013/0284313 A1* | 10/2013 | Kojima et al. | 141/38 |

FOREIGN PATENT DOCUMENTS

| | | |
|---|---|---|
| JP | 2007-106071 A | 4/2007 |
| JP | 2007-118310 A | 5/2007 |
| JP | 2010-023244 A | 2/2010 |

* cited by examiner

CAP UNIT FOR A TIRE PUNCTURE REPAIR APPARATUS

TECHNICAL FIELD

The present invention relates to a cap unit for use in a tire puncture emergency repair apparatus to feed puncture-sealing agent and compressed air in succession into a punctured tire so as to repair the puncture as an emergency procedure, and in particular relates to a cap unit guarding against a reversed flow of the puncture-sealing agent toward a compressor.

BACKGROUND OF THE INVENTION

A unit having the structure shown in FIG. 13(A) is known as a cap unit (a) for the above-mentioned tire puncture emergency repair apparatus, for example. This cap unit (a) is provided with a cap main body (c) comprising an opening-attaching concave part (c1) inserting and fixing an opening (b1) of a bottle container (b). The cap main body (c) comprises an air passage (e) to feed the compressed air from a compressor (d) through an air intake port (e1) into a bottle container (b), and a sealing agents/compressed air extractive flow passage (f) to extract the puncture-sealing agent and the compressed air from the bottle container (b) to the tire T by feeding the compressed air.

A basal plane of the opening-attaching concave part (c1) is provided convexly with a column-shaped boss part (g); and an air flow passage upper opening (e2) forming an upper end of the above-mentioned airflow passage (e), and a sealing agent/compressed air extractive flow passage upper opening (f2) forming an upper end of the above-mentioned sealing agents/compressed air extractive flow passage (f) are opened on an upper end of this boss part (g). Incidentally, the air flow passage upper opening (e2) and the sealing agent/compressed air extractive flow passage upper opening (f2) are closed with an inner cap (i) connected with the above-mentioned boss part (g) so as to prevent an escape of the puncture-sealing agent.

Thus, at a time of puncture repairing, the compressed air is supplied to the air flow passage (e) by an actuation of the compressor (d). In this time, first of all, the inner cap (i) is automatically taken off from the boss part (g) by an increase of inside pressure; then, the compressed air inflows into the bottle container (b), and the puncture-sealing agent and the compressed air are injected in the tire T in succession, and the puncture emergency repair and a pump-up of the tire T are continuously conducted.

However, in the tire puncture emergency repair apparatus, while puncture repairing, there is a possibility of disconnection between the compressor (d) and the cap main body (c) because someone catches on the hose or drops the apparatus. In this case, there is a problem that the puncture-sealing agent inside the bottle container (b) belches from the air intake port (e1) and pollutes the surroundings because a high pressure (350 pKa, for example) is exerted in the bottle container (b).

However, the following Patent Document 1 makes a proposition to provide in the above-mentioned air flow passage (e) with a reversed flow preventing device (j) as shown in FIG. 13 (B). This reversed flow preventing device (j) prevents the remnant of the puncture-sealing agent collected inferiorly after repairing the puncture from leaking toward a compressor owing to its own weight. The reversed flow preventing device (j) is provided in a vertical air flow passage (ea) with a valve seat portion (j1) having a reduced diameter. The reversed flow preventing device (j) is provided above the valve seat portion j1 with a spherical valve j2, and in an air flow passage upper opening e2 with a secured pin j3 to prevent the spherical valve j2 from dropping.

In this structure, the secured pin j3 is connected with the air flow passage upper opening e2. Owing to the structure of shape forming mold, the vertical air flow passage (ea) has a diameter superiorly enlarging, and a joint with the secured pin j3 is likely to slack. Therefore, the compressed air from the compressor (d) makes it easier for the secured pin j3 to drop out and may cause the dropping of the spherical valve j2. Since the spherical valve j2 moves freely in the vertical airflow passage (ea), the valve function gets unstable; and when the puncture-sealing agent reversely flows at high pressure, the spherical valve j2 moves, and there is a difficulty of certainly preventing the reversed flow.

Patent Document 1: Japanese Unexamined Patent Application Publication No. 2010-023244.

DISCLOSURE OF THE INVENTION

Problems to be Solved by the Invention

The present invention has an objective of providing a cap unit capable of keeping a high assemblage activity, improving a stable valve function while preventing certainly a dropping of a spherical valve, preventing a reversed flow of puncture-sealing agent, and improving safety.

Means for Solving the Problem

To achieve the above-mentioned objective, the invention of the present application provides a cap unit attached to an opening of a bottle container containing puncture-sealing agent, and comprising a cap main body comprising an air flow passage to feed compressed air from a compressor into the bottle container through an air intake port, and a sealing agent/compressed air extractive flow passage to extract the puncture-sealing agent and the compressed air from the bottle container in succession by the feed of the compressed air. The cap main body is provided in an upper end part of the cap main body with an opening-attaching concave part for inserting and fixing of said opening of the bottle container, and with a boss part projecting from a basal plane of the opening-attaching concave part. An upper end face part of said boss part comprises an air flow passage upper opening forming an upper end of said air flow passage, and a sealing agent/compressed air extractive flow passage upper opening forming an upper opening of the sealing agent/compressed air extractive flow passage. The air flow passage comprises a reversed flow preventing device to prevent from reversed flow of the puncture-sealing agent toward a compressor. The air flow passage is provided with a vertical flow passage extending inferiorly from said air flow passage upper opening, a lateral flow passage extending laterally from said air intake port, and a connecting flow passage connecting them. The cap main body comprises a vertical hole with steps, of which internal diameters increase downwardly in a stepwise manner, and the vertical hole including:

a first vertical hole extending from said air flow passage upper opening, a second vertical hole leading toward the first vertical hole with a first step surface, a third vertical hole leading toward the second vertical hole with a second step surface, and a fourth vertical hole, leading toward the third vertical hole with a third step surface, having the lower end thereof opening in a basal plane of the cap main body, and being provided in a lower end part with a securing groove extending in the circumferential direction.

The vertical flow passage is formed of said first to third vertical holes, and a valve seat case comprising said connecting flow passage is inserted from the lower end of the fourth vertical hole and kept therein. The reversed flow preventing device comprises a ring-shaped valve seat disposed in an upper end of the valve seat case and connecting said vertical flow passage with said connecting flow passage, a ball-shaped spherical valve inserted movably into said third vertical hole and enabling to open and close the valve seat, and a biasing spring disposed in said second vertical hole and biasing the spherical valve toward the valve seat.

The valve seat case is provided with a preventing dropping device to prevent dropping from the fourth vertical hole by an engagement with said securing groove.

The invention of is characterized in that the valve seat case comprises a column-shaped basal portion to be inserted into the fourth vertical hole. And, the preventing dropping device comprises a central hole extending superiorly from a lower end of said basal portion along a shaft center and forming an annular peripheral wall around the central hole, a plurality of slits each having a small width and extending superiorly in radiating-manner from the lower end so as to divide the peripheral wall into plural circumferential fan-like pieces deformable elastically in the radial direction, and a circumferential securing rib protruded on an outer circumferential surface of each of the fan-shaped pieces and being engageable with the securing groove.

The invention of is characterized in the valve seat case comprises the column-shaped basal portion to be inserted into the fourth vertical hole, and a valve seat junction concave portion disposed on an upper end of the basal portion to attach the valve seat. And, the connecting flow passage is L shaped, comprising a vertical connecting flow passage opening in a basal plane of the valve seat junction concave portion and conducting said vertical flow passage, and a lateral connecting flow passage bent at the lower end of the vertical connecting flow passage, opening on an outer circumferential surface of the basal portion, and conducting said lateral flow passage.

The invention is characterized in that the valve seat case is provided on both of the upper and lower sides of the opening of said lateral connecting flow passage with an O-shaped ring to seal an interspace between the valve seat case and the fourth vertical hole.

The invention of is characterized in that said valve seatcase is despined inside the fourth vertical hole around the shaft center by a despining device.

Effect of the Invention

The present invention has the above-mentioned structure stated above so that it is easy to assemble a reversed flow preventing device by inserting a biasing spring and a spherical valve and a valve seat case in succession from a lower end of vertical hole into the vertical hole with steps, which internal diameters gradually increase downward from an air flow passage upper opening.

In the above-mentioned reversed flow preventing device, since a first vertical hole located on the side closest to an air flow passage upper opening has the smallest diameter, the dropping of the conventional spherical valve can be certainly prevented. A biasing spring disposed in a second vertical hole biases the spherical valve toward the valve seat. Therefore, when the puncture-sealing agent reversely flows at high pressure, a shifting of the spherical valve occurs few, and it is possible to make the spherical valve operate steadily. And the valve seat case is provided with a preventing dropping device to interlock a securing groove formed in the vertical hole. Therefore, at a high inner pressure of 350 kPa, for example, the valve seat case does not drop from the vertical hole and can be certainly kept. There is enough space on a butt end's side of the valve seat case, it is easy to form the above-mentioned preventing dropping device.

EXPLANATION OF THE REFERENCE

Figure 1:
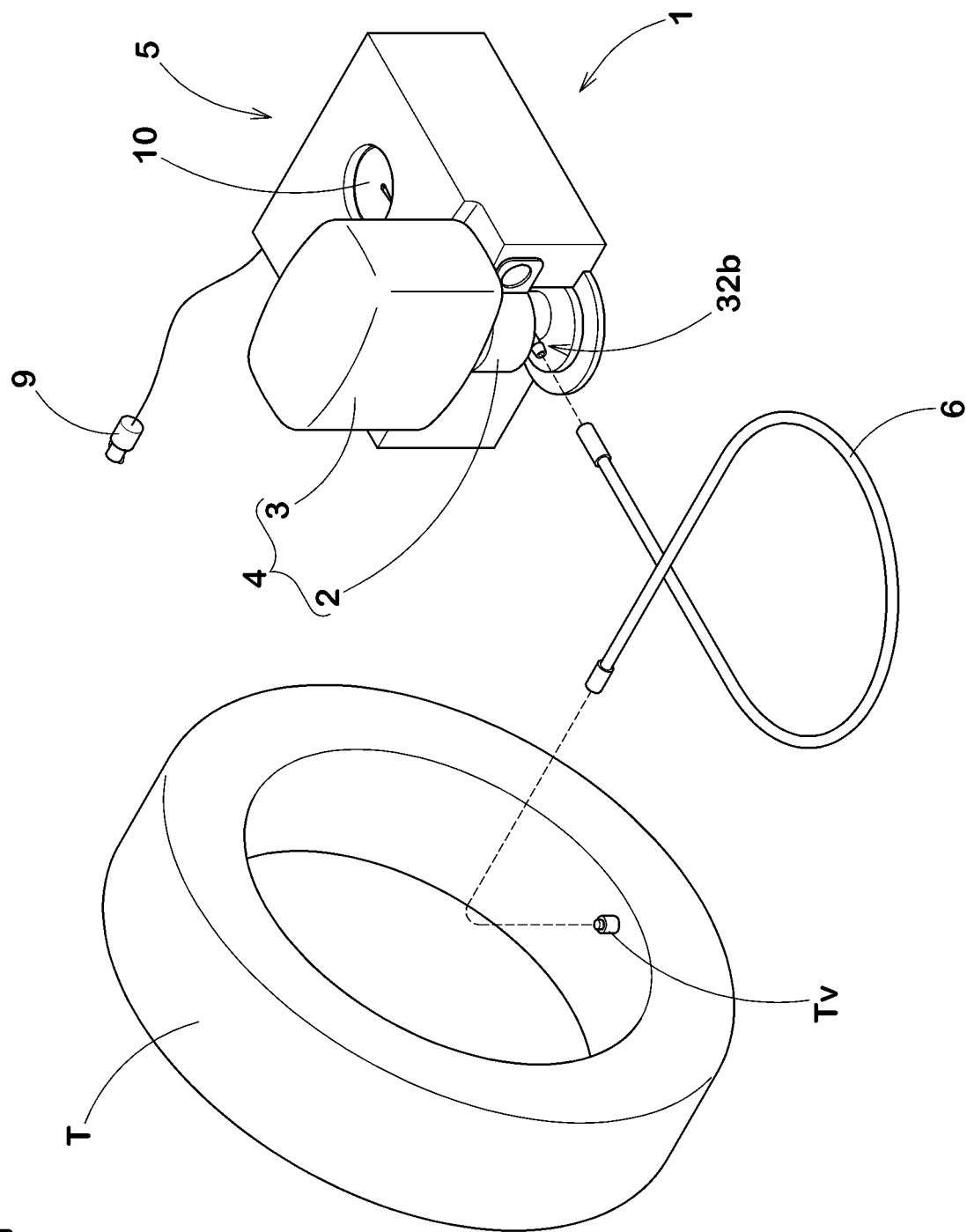
FIG. 1 A diagrammatic perspective view showing a use situation of a tire puncture emergency repair apparatus by use of a cap unit of the present invention.

2 Cap unit
3 Bottle container
5 Compressor
7 Opening
20S upper end face part
22 Reversed flow preventing device
23 valve seat
24 Spherical valve
25 Biasing spring
31 Air flow passage
31A vertical flow passage
31B Lateral flow passage
31C Connecting flow passage
31Ca vertical connecting flow passage
31Cb Lateral connecting flow passage
31a Air flow passage upper opening
31b Air intake port
32 sealing agent/compressed air extractive flow passage
32a Sealing agent/compressed air extractive flow passage upper opening
33 cap main body 36A Opening-attaching concave part
36B Boss part
40 vertical hole
40A-40D First to fourth vertical holes
42 valve seat case
41 Securing groove
43 Basal portion
43a valve seat junction concave portion
43c Peripheral wall
43c1 Fan-shaped piece
44 Preventing dropping device
45 O-shaped ring
46 Central hole
47 Slit
48 Securing rib
50 Despining device
S1-S3 First to third step surfaces

BEST MODE FOR CARRYING OUT THE INVENTION

Hereinafter, embodiments of the present invention will be described in detail. FIG. 1 is a diagrammatic perspective view showing a use situation of a tire puncture emergency repair apparatus 1 with use of a cap unit 2 of the present invention. The tire puncture emergency repair apparatus 1 comprises a bottle unit 4 attaching a bottle container 3 containing a puncture-sealing agent to a cap unit 2, and a compressor 5 connected to the bottle unit 4.

The compressor 5 and the bottle unit 4 are, in a puncture-repairing scene in the present embodiment, directly connected without hose and the like intervention. A sealing agent/compressed air discharge spout 32b disposed in the cap unit 2 is connected with a second end of a feeding hose 6, which first end is connected with an air valve Tv of a tire T. The bottle unit 4 is connected with the compressor 5 at an inverted upright state that the cap unit 2 is inferiorly oriented. A reference number 9 in drawings indicates a plug for power supply for driving the compressor 5 and is connected with an automotive cigarette socket in the present embodiment. The reference number 10 indicates a manometer of the compressor 5.

Figure 3:
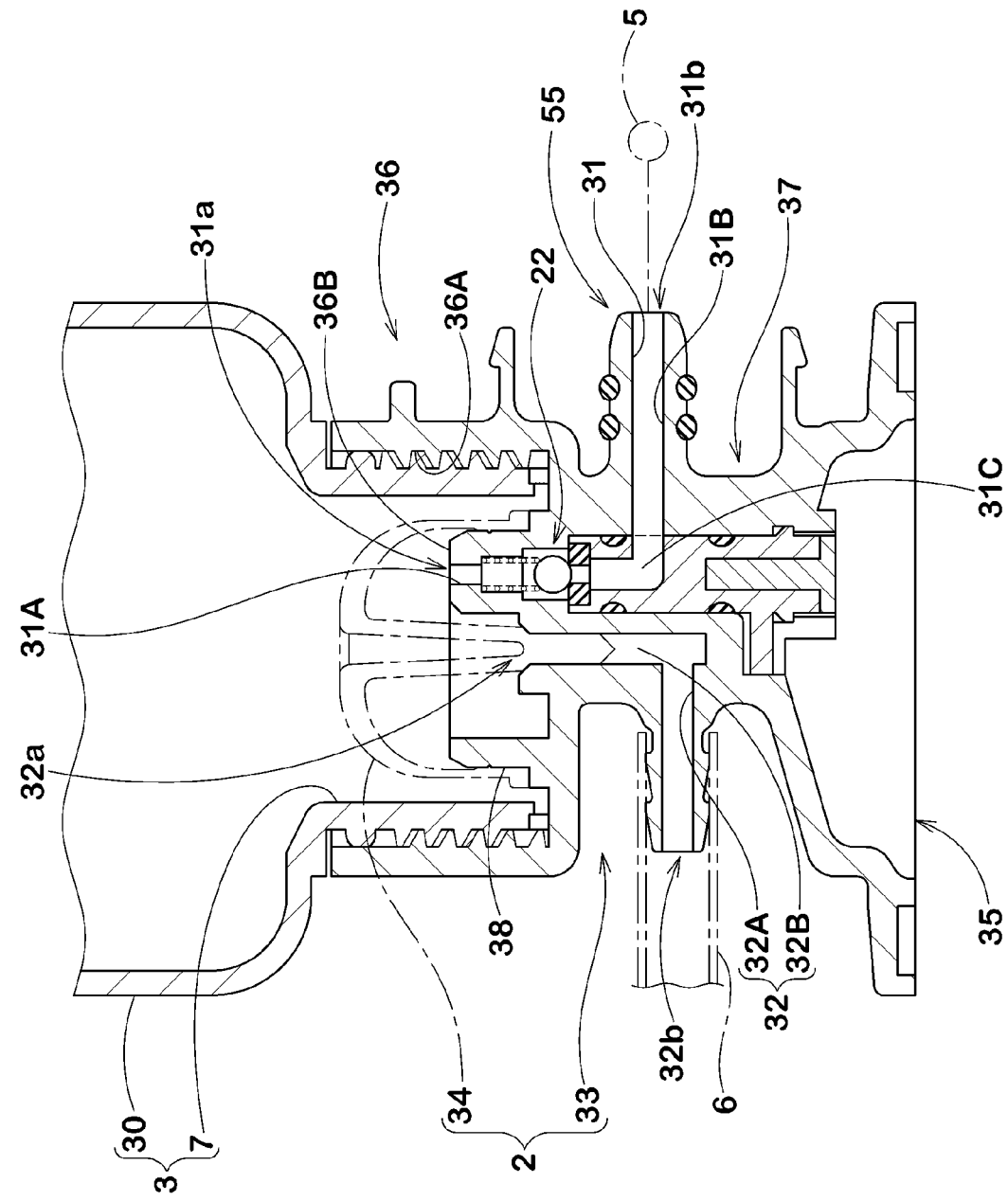
FIG. 3 A cross-sectional view showing an attached situation of a bottle container to the cap unit.
Figure 12:
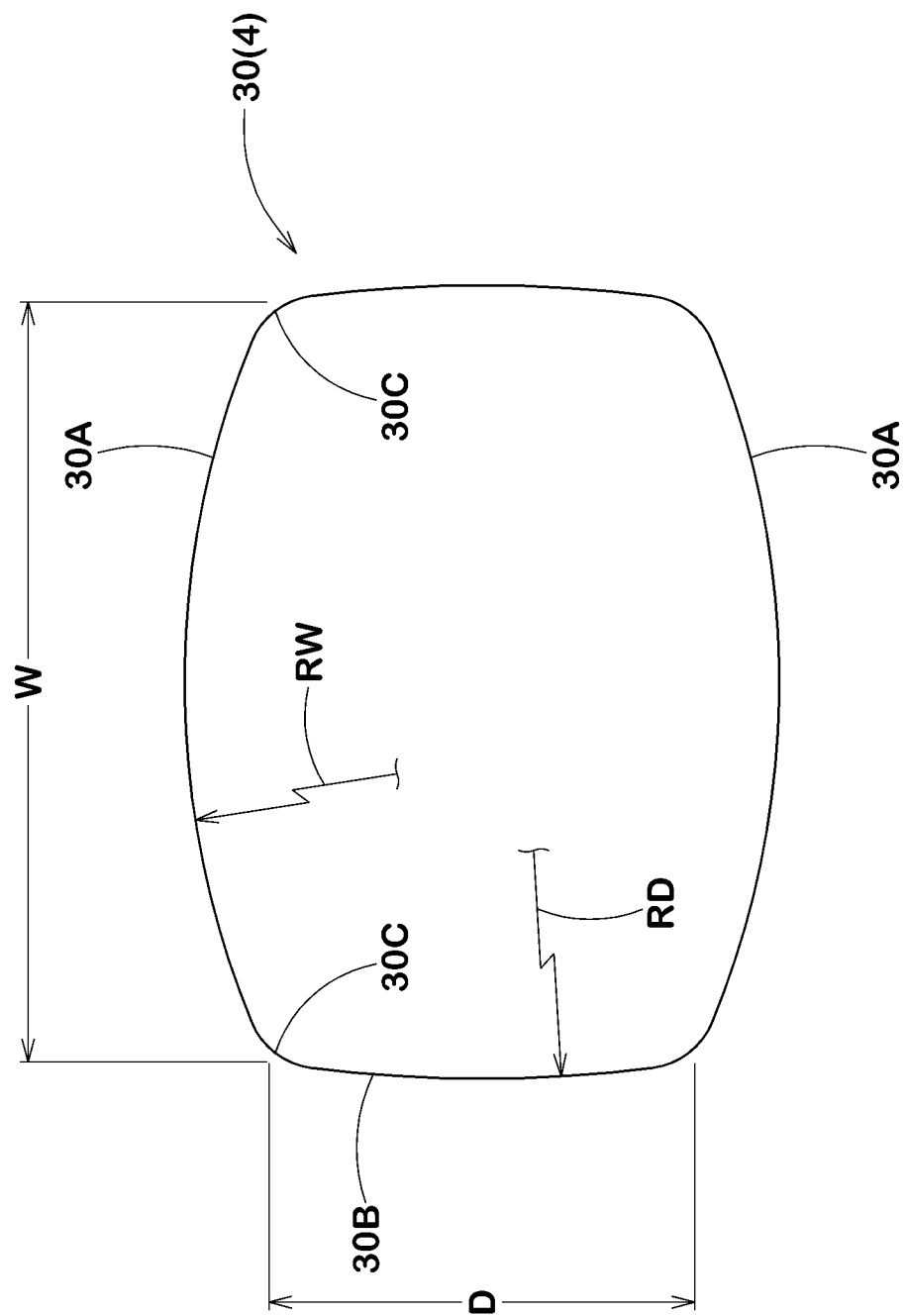
FIG. 12 A cross-sectional view showing a cross-section of the bottle container.
Figure 13A:
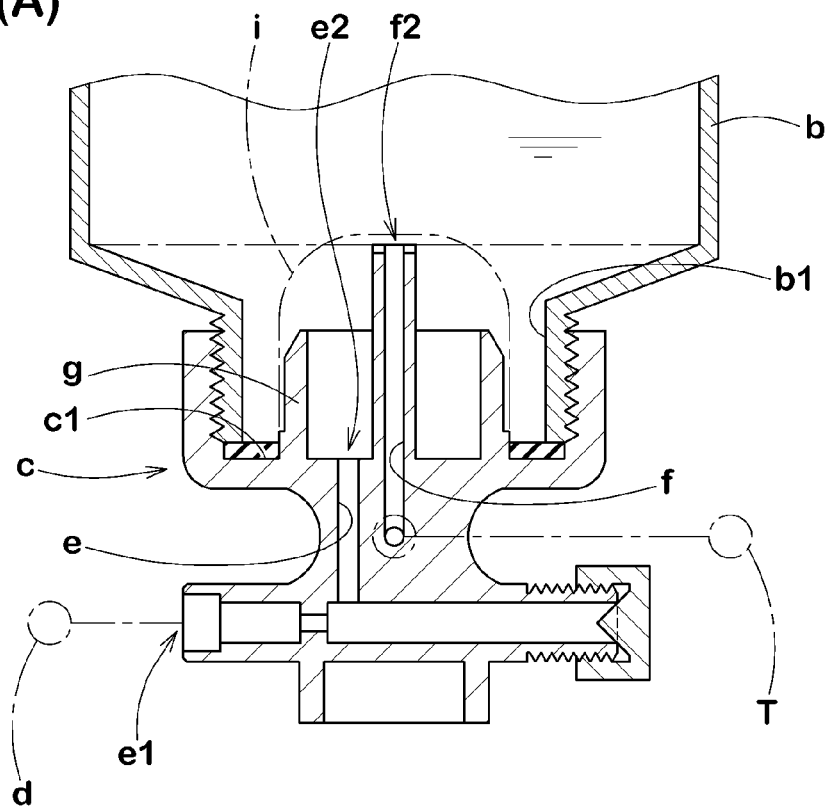
FIGS. 13 (A) and (B): cross-sectional views showing a conventional cap unit.
Figure 13B:
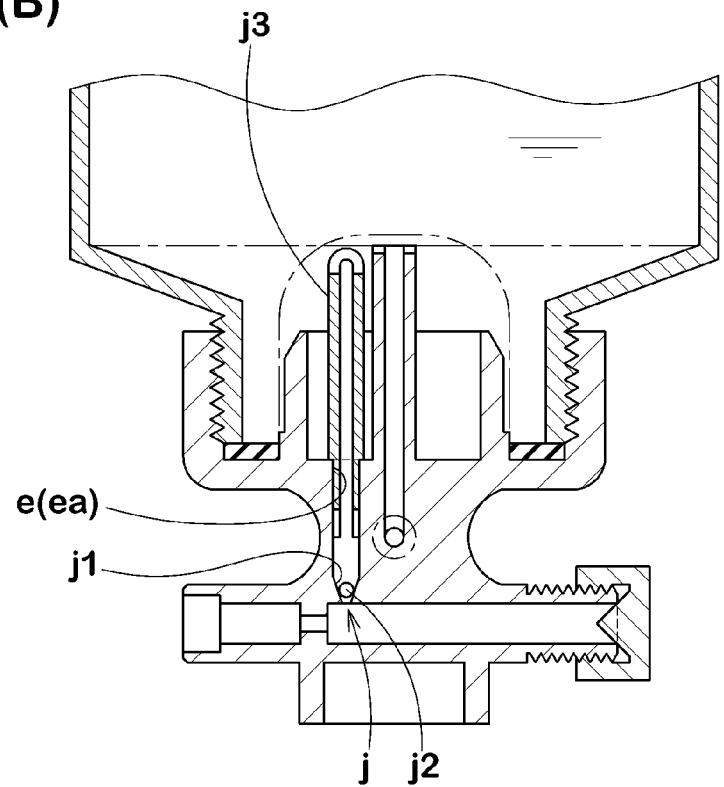

In the above-mentioned bottle container 3, as shown in FIG. 3, a cylindrical opening 7 having a small diameter and enabling the puncture-sealing agent to getting in and out extrudes at a lower end of a trunk body 30. In the present embodiment, the cross section perpendicular to the height direction of the trunk body 30 is formed as a substantial rectangle surrounded on four sides by a pair of convexly-arc-shaped long side parts 30A and a pair of convexly-arc-shaped short side parts 30B toward the outside of the bottle, as shown in FIG. 12. Thus, when a length of the long side part 30A is defined as W, a radius of curvature of the long side part 30A is defined as RW, a length of the short side part 30B is defined as D, and a radius of curvature of the short side part 30B is defined as RD, in this embodiment, they are set to values to meet the following relations (1)-(3):

$$1.3 \leq W/D \leq 1.7 \tag{1}$$

$$0.5 \leq RW/W \leq 3.0 \tag{2}$$

$$0.5 \leq RD/D \leq 20.0 \tag{3}$$

Giving an ease of storage of the tire puncture emergency repair apparatus 1 in a car, particularly in a trunk of the car for example, it is preferable to form the trunk body 30 of the bottle container 3 as a substantially cuboid since the above-mentioned compressor 5 is substantially cuboid. A high inner pressure of nearly 350 kPa, for example, acts on the bottle container 3 at the time of puncture repairing. At this time, in the case that the trunk body 30 has a round cross-sectional shape, since the trunk body 30 is inflated equally in the radial direction by the internal pressure, a user does not much recognize its deformation at the time of compressed-air filling, and an anxious feeling of the user is low. However, in case that then the trunk body 30 has a rectangle cross-sectional shape, the trunk body 30 is inflated unevenly by the internal pressure, and the shape deforms from a rectangle cross-sectional shape into nearly a round cross-sectional shape and the like. The user feels the deformation volume more greatly than in reality. Therefore, it may provoke the user's anxiety about burst and the like while the pressure is within a withstanding pressure range.

In the present embodiment, each of the long side part 30A and the short side part 30B is previously formed as a convex arc so as to have a shape close to a deformed shape at the time of inflating. Therefore, the user does not much recognize its deformation at the time of compressed air filling, and the anxious feeling of the user can be kept low while improving the storage behavior.

The result of the test by of the inventor the present application shows that it is important to inhibit the long-side volume to keep the anxious feeling of the user low. For that purpose, it is preferably that a long-side length W is set to be large and that a radius of curvature RW is set to be small. If the ratio W/D is less than 1.3, or if the ratio RW/W is over 3.0, the length W becomes relatively small, or the radius of curvature RW becomes large, and the long-side volume of inflating increases. If the ratio W/D is over 1.7, or if the ratio RW/W is less than 0.5, the storage behavior degrades. If the ratio RD/D is over 20.0, the short-side volume of inflating increases, and the deformation at the time of compressed air filling becomes large. If the ratio RD/D is less than 0.5, the storage behavior degrades. Based on these standpoints, the lower limit of the ratio W/D is more preferably not less than 1.4, and the upper limit of the ratio W/D is more preferably not more than 1.6. The lower limit of the ratio RW/W is more preferably not less than 0.7, and the upper limit of the ratio RW/W is more preferably not more than 2.0. The lower limit of the ratio RD/D is more preferably not less than 1.0, and the upper limit of the ratio RD/D is more preferably not more than 10.0.

A corner portion where the long side part 30A intersects with the short side part 30B is preferably formed as an arc 30C having a radius of curvature of 15 mm±5 mm to moderate stress concentration and to improve pressure resistance.

Figure 2:
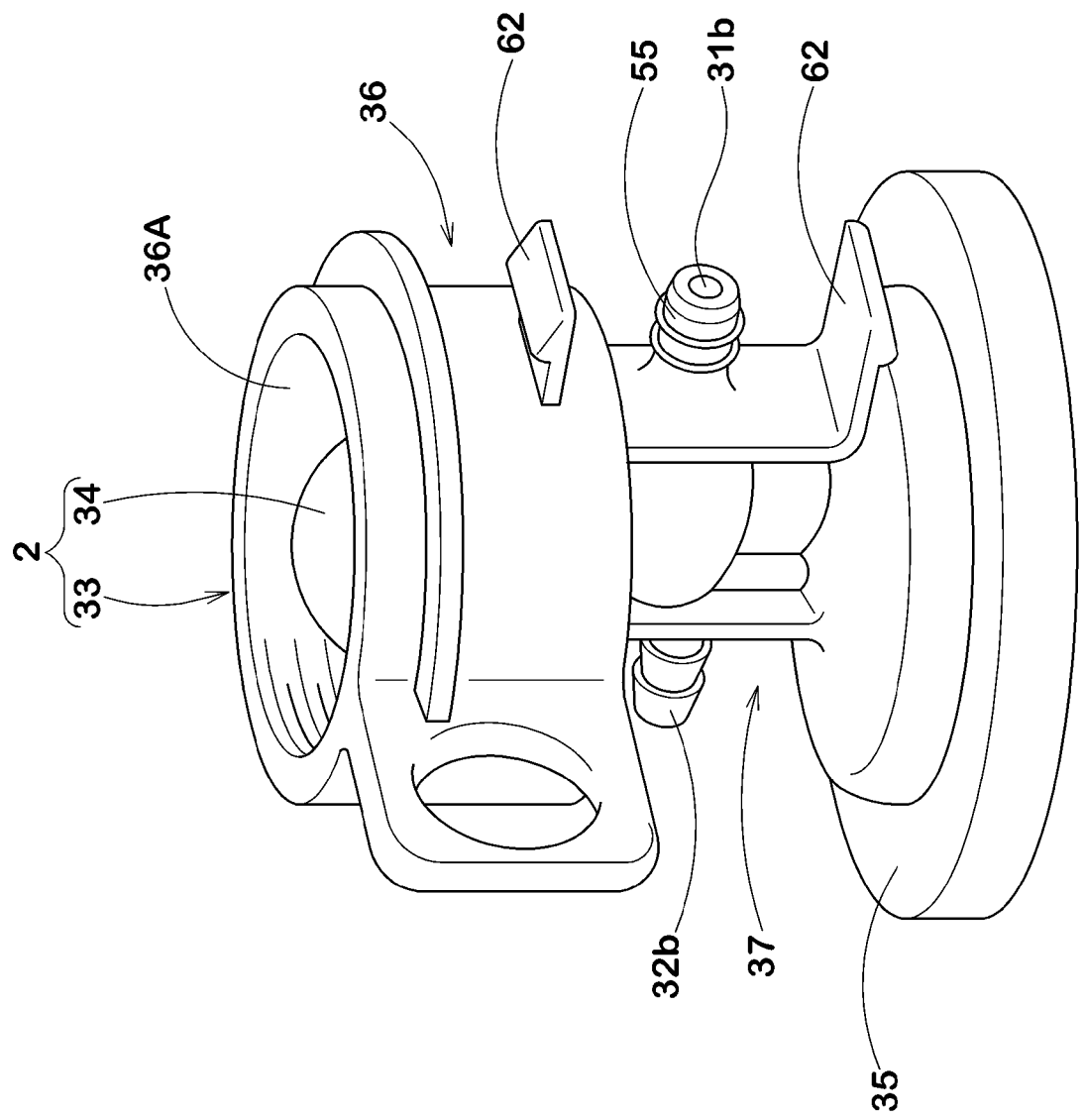
FIG. 2 A diagrammatic perspective view showing the cap unit.

The cap unit 2 comprises a cap main body 33 and an inner cap 34 attached to the cap main body 33 as shown in FIGS. 2 and 3. The cap main body 33 is attached to an opening 7 of the bottle container 3.

The cap main body 33 comprises
    an air flow passage 31 to send the compressed air, which comes from the compressor 5, from an air intake port 31b into the bottle container 3, and
    a sealing agent/compressed air extractive flow passage 32 to extract the puncture-sealing agent and the compressed air from the bottle container 3 in succession by the compressed-air sending.

The air flow passage 31 is provided with a reversed flow preventing device 22 to prevent from
a reversed flow of the puncture-sealing agent into the compressor.

More particularly, the cap main body 33 is integrally provided with an opening junction 36 in an upper end part of the cap main body 33, a basal plate part 35 in a lower end part of the cap main body 33, and a waist part 37 therebetween.

The opening junction 36 comprises an opening-attaching concave part 36A to fix the inserted opening 7, and a boss part 36B projecting from the basal plane of this opening-attaching concave part 36A. The opening-attaching concave part 36A can spirally fasten the opening 7 with an inside screw arranged in an inner sidewall face of the opening-attaching concave part 36A.

Figure 4A:
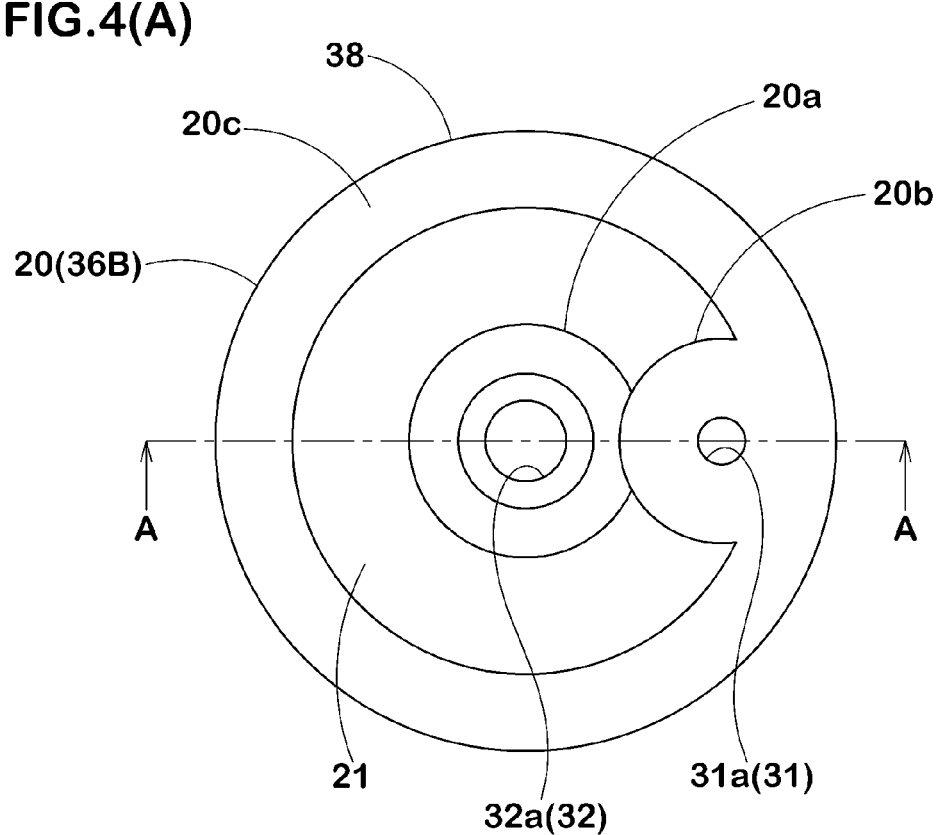
FIGS. 4 (A): A plan view of a boss part; (B): a cross-section view taken along line A-A.
Figure 4B:
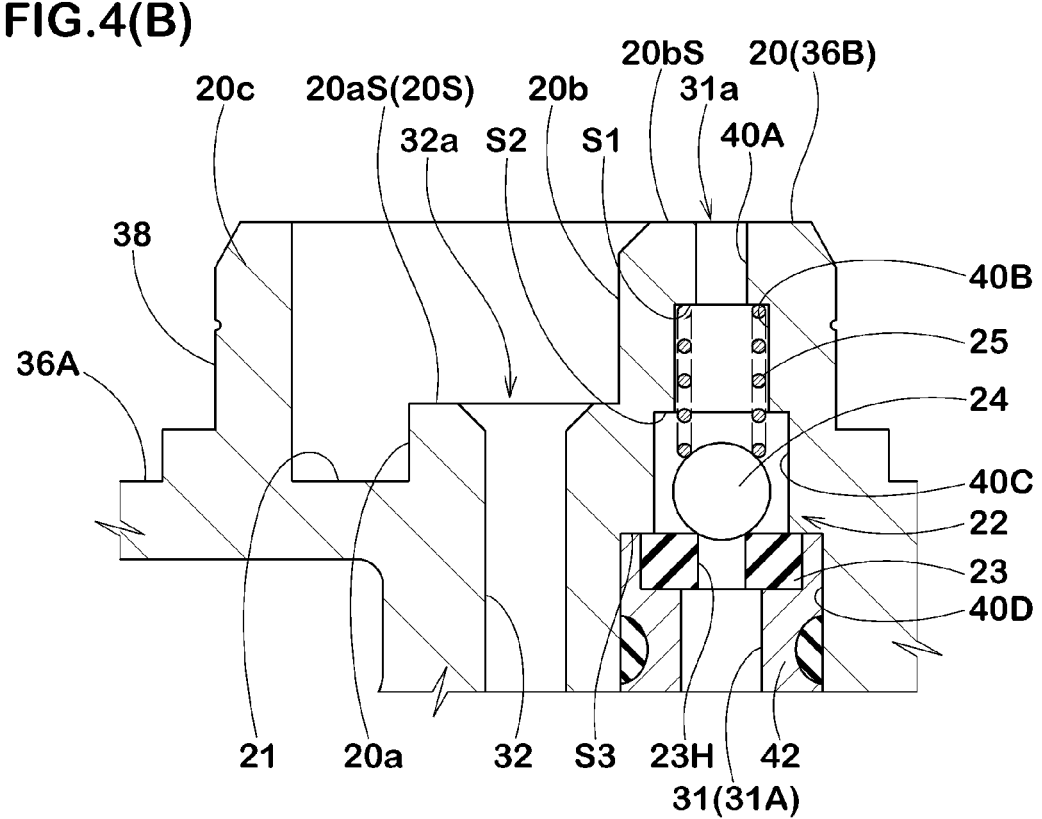

The boss part 36B comprises a column-shaped basal body 20 having an outer circumferential surface forming an inner cap connecting surface 38 to connect the inner cap 34 as shown in FIGS. 4(A) and 4(B). In the upper end face part 20S of the basal body 20 comprises an air flow passage upper opening 31a forming the upper end of the air flow passage 31 and an sealing agent/compressed air extractive flow passage upper opening 32a forming the upper end of the sealing agent/compressed air extractive flow passage 32.

In the present embodiment, the basal body 20 is provided in its upper end, for example, with a concave portion 21 hollowing as substantially same as the depth of the opening-attaching concave part 36A. The basal plane of the concave portion 21 comprises a first elevated portion 20a and a second elevated portion 20b. The upper end face part 20S comprises the basal plane of the concave portion 21, the upper end face 20aS of the first elevated portion 20a, and the upper end face 20bS of the second elevated portion 20b, and the upper end face of an annular peripheral wall 20c surrounding the concave portion 21. The first elevated portion 20a is column-shaped having substantially the same concentric as the boss part 36B, and protrudes in low height from the basal plane of the concave portion 21. Its upper end face 20aS comprises the sealing agent/compressed air extractive flow passage upper opening 32a.

The second elevated portion 20b has a columnar shape disposed between the first elevated portion 20a and the peripheral wall 20c, and protrudes toward a height at least over the upper end of the first elevated portion 20a, and its upper end face 20bScomprises the air flow passage upper opening 31a. In the present embodiment, the sealing agent/compressed air extractive flow passage upper opening 32a opens lower than the air flow passage upper opening 31a so as to reduce the puncture-sealing agent collected at the bottom to flow into the airflow passage 31 after puncture repairing. In the present embodiment, the second elevated portion 20b has substantially the same height as the peripheral wall 20c.

The air flow passage 31 comprises
  a vertical flow passage 31A extending inferiorly from the air flow passage upper opening 31a,
  a lateral flow passage 31B extending laterally from the air intake port 31, and
  a L-shaped connecting flow passage 31C connecting them as shown in FIG. 3.

Figure 5:
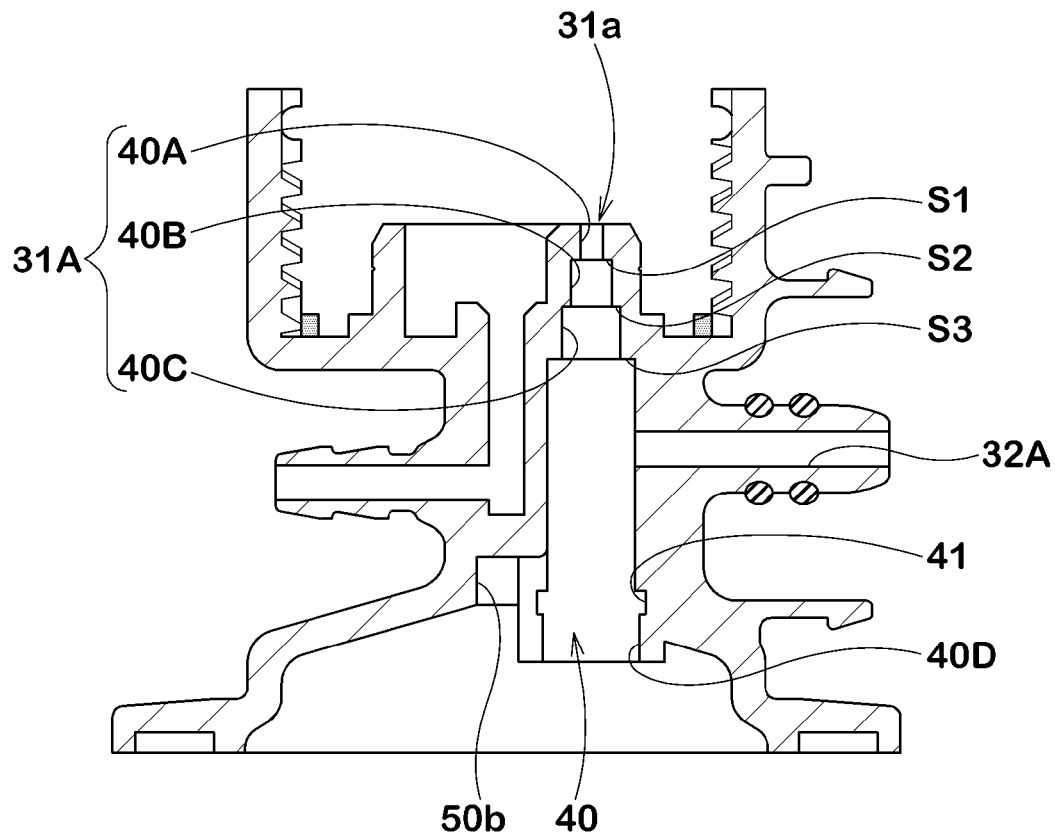
FIG. 5 A cross-sectional view showing an attachment of a valve seat case to a vertical hole.
Figure 5:
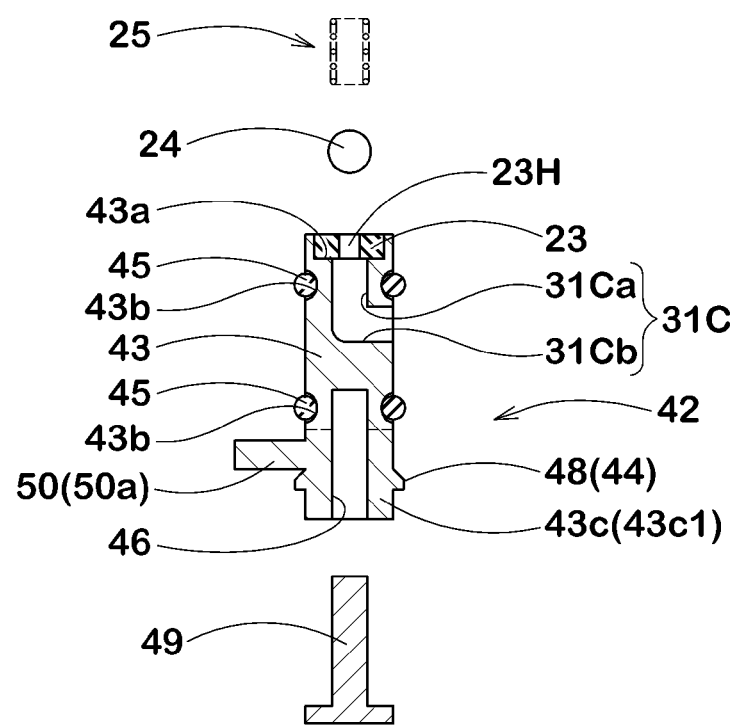

The cap main body 33 comprises a vertical hole 40 with steps, which internal diameters gradually increase downward from the air flow passage upper opening 31a as shown in FIG. 5.

This vertical hole 40 includes
  a first vertical hole 40A extending from the air flow passage upper opening 31a,
  a second vertical hole 40B leading toward the first vertical hole 40A with a first step surface S1,
  a third vertical hole 40C leading toward the second vertical hole 40B with a second step surface S2, and
  a fourth vertical hole 40D, leading toward the third vertical hole 40C with a third step surface S3, having the lower end thereof opening in a basal plane of the cap main body 33, and providing with a securing groove 41 on a lower end side in the circumferential direction.

The vertical flow passage 31A is formed of the first to third vertical holes 31A, and a valve seat case 42 is inserted from the lower end of the fourth vertical hole 40D and been kept therein.

This valve seat case 42 comprises a column-shaped basal portion 43 inserted into the fourth vertical hole 40D, and in the upper end of the basal portion 43 is provided with a valve seat junction concave portion 43a for attaching the valve seat 23. The lower end of the basal portion 43 is provided with a preventing dropping device 44 to prevent dropping from the fourth vertical hole 40D by an engagement with the securing groove 41. Incidentally, the valve seat 23 is formed of a ring body comprising a valve hole 23H. This valve seat 23 is made of a hard rubber elastic body, in the present embodiment, and kept between the third step surface S3 and the basal plane of the valve seat junction concave portion 43a.

The basal portion 43 comprises the connecting flow passage 31C.

This connecting flow passage 31C comprises
  a vertical connecting flow passage 31Ca opening in the basal plane of the valve seat junction concave portion 43a and conducting with the vertical flow passage 31A via the valve hole 23H, and
  a lateral connecting flow passage 31Cb bent at the lower end of the vertical connecting flow passage 31Ca, opening on the outer circumferential surface of the basal portion 43 and conducted with the lateral flow passage 31B.

Around the basal portion 43, O-shaped ring junction grooves 43b and 43b having a semi-arc shape in cross-section are formed to joint an O-shaped ring 45 to seal between the basal portion 43 and the fourth vertical hole 40D at each of a more upper position and a more lower position than the opening of the lateral connecting flow passage 31Cb. The lateral flow passage 31B and a connecting flow passage 31C are therefore thickly jointed.

Figure 6A:
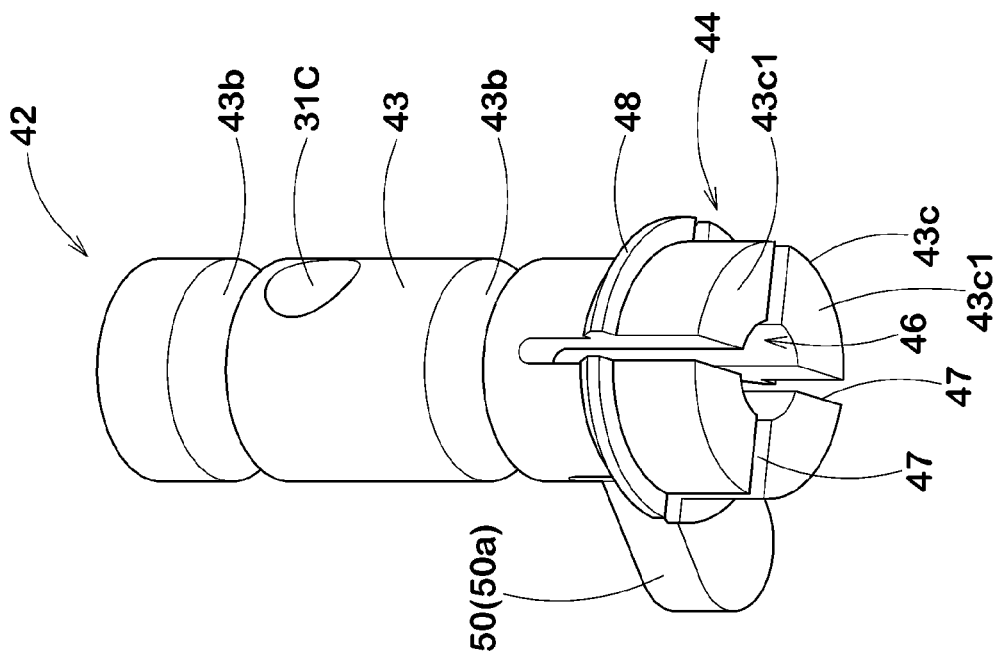
FIGS. 6 (A) and (B): A side view of a valve seat case and a diagrammatic perspective view.
Figure 6B:
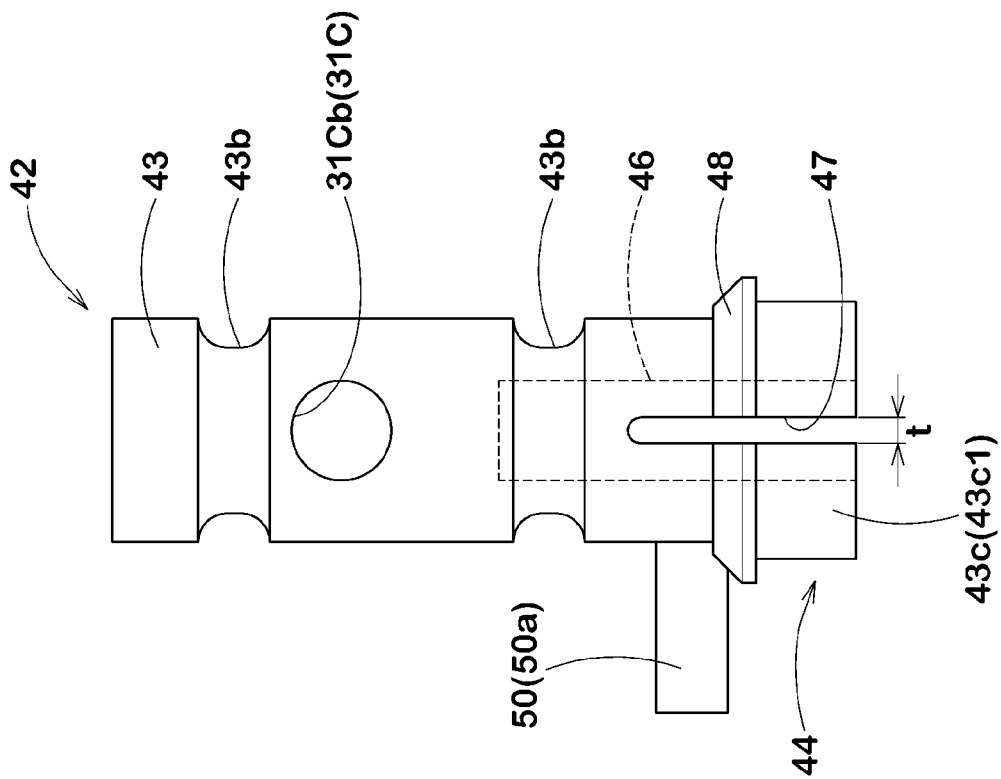

The preventing dropping device 44 comprises
  a central hole 46 extending superiorly from the lower end of the basal portion 43 along the shaft center,
  a plural of slits 47 having a small width and dividing an annular peripheral wall 43c formed around the central hole 46 into a plurality of fan-shaped pieces 43c1 in the circumferential direction, and
  a securing rib 48 in the circumferential direction arranged in a protruding condition in an outer circumferential surface of the fan-shaped piece 43c1 and being capable of interlocking with the securing groove 41 as shown in FIG. 6.

The central hole 46 terminates below the connecting flow passage 31C. The slit 47 extends from the lower end of the basal portion 43 superiorly in radiating fashion. The peripheral wall 43c is divided into a plurality of fan-shaped pieces 43c1 deformable elastically in the radial direction. In particular, not be restricted, the width (t) of the slit 47 is preferably about 0.5 to 1.5 mm, and its number (n) is preferably 3 to 5. This enables therefore the basal portion 43 to reduce elasticity its diameter by up to $(t \cdot n)\pi$, and the valve seat case 42 can be inserted into the fourth vertical hole 40D with the securing rib 48. The securing rib 48 is interlocked with the securing groove 41 and retained by an elastic recovery of the fan-shaped piece 43c1 after the insertion.

The preventing dropping device 44 of the present example comprises an intrusive shaft 49 connecting with the central hole 46. The intrusive shaft 49 prevents the radially inward elastic deformation of the fan-shaped piece 43c1 and interlocking-dropping of the securing rib 48 from the securing groove 41.

The valve seat case 42 is despined inside the fourth vertical hole 40D around the shaft center by a despining device 50. The despining device 50 comprises a lever-shaped protrusion 50a protruding from the outer circumferential surface of the basal portion 43, for example. The protrusion 50a interlocks with a concave portion 50b in groove fashion, cutout fashion or the like for example, arranged in the fourth vertical hole 40D, thereby restraining a movement of the valve seat case 42 around the shaft center. At the time of insertion of the valve seat case 42, the despining device 50 is used for position adjustment of the opening of lateral flow passage 31B and the opening of the lateral connecting flow passage 31Cb.

As shown in FIGS. 4 and 5, the reversed flow preventing device 22 comprises
the valve seat 23,
a ball shaped spherical valve 24 inserted movably inside the third vertical hole 40C and enabling a valve hole 23H of the valve seat 23 to open-and-close, and
a biasing spring 25 disposed in the second vertical hole 40B and biasing the spherical valve 24 toward the valve seat 23.

The biasing spring 25 is a compressed coil-like spring having a smaller internal diameter than that of the spherical valve 24, and can close the valve by pushing the spherical valve 24 toward the valve seat 23 at normal time. At the time of compressed-air filling, the valve can be released by the internal pressure, and the compressed air can flow into the bottle container 3 through an interspace between wires. The lower end of the biasing spring 25 protrudes more inferiorly than the second step surface S2. A diameter of the spherical valve 24 is larger than at least that of the first vertical hole 40A, and the protruberance of the spherical valve 24 is certainly prevented.

The sealing agent/compressed air extractive flow passage 32 is L-shaped and comprises
a vertical flow passage 32A extending inferiorly from the sealing agent/compressed air removal port 32a, and
a lateral flow passage 32B bent at the lower end of the vertical flow passage 32A and extending laterally to the above-mentioned sealing agents/compressed air discharge spout 32b as shown in FIG. 3. In the present embodiment, the vertical flow passage 32A is formed as a central hole passing through the center of the boss part 36B.

Figure 7:
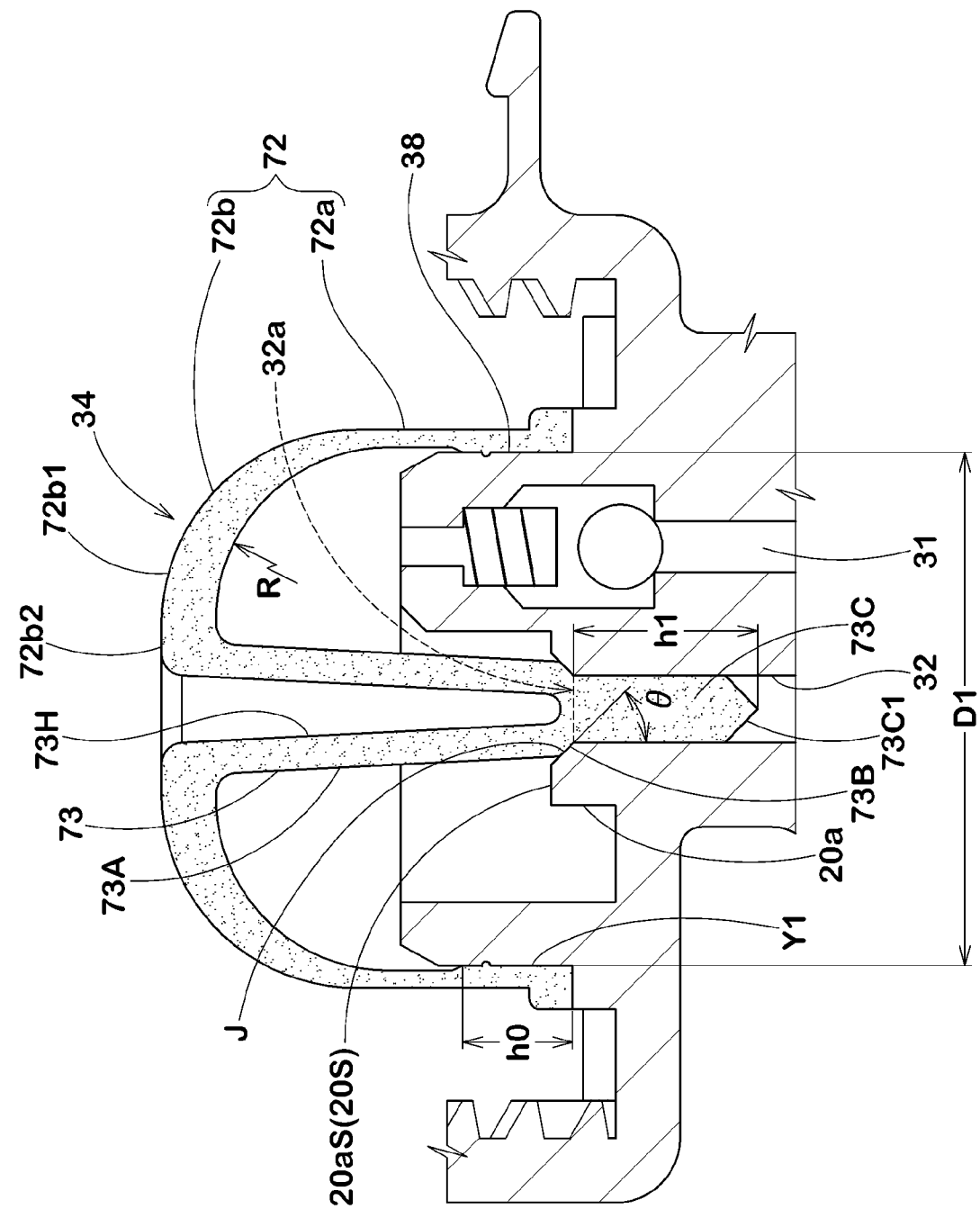
FIG. 7 A cross-sectional view showing an attachment situation of an inner cap.

As shown in FIG. 7, the inner cap 34 closes the air flow passage 31 and the sealing agent/compressed air extractive flow passage 32 inside the bottle container 3. This prevents the puncture-sealing agent from flowing into the air flow passage 31 and the sealing agent/compressed air extractive flow passage 32 during storage.

The inner cap 34 is formed of elastically deformable synthetic resin material such as polyethylene and polypropylene, for example.

The inner cap 34 comprises integrally
an inner cap main body 72 comprising
a cylindrical trunk part 72a, which is connected to the inner cap connecting surface 38, and
an upper plate part 72b to close the upper end of the cylindrical trunk part 72a; and
a stop shaft 73 to close the sealing agent/compressed air removal port 32a by protruding inferiorly from the upper plate part 72b and being inserted into the sealing agent/compressed air removal port 32a.

The upper plate part 72b is a substantially hemispherical shape comprising
an arc 72b1 jointing with the trunk part 72a and having a radius of curvature R, in the present embodiment. The radius of curvature R is set in a range of from 0.3 to 0.5 times the internal diameter D1 of the trunk part 72a. The radius of curvature R is incidentally a radius of curvature measured in the inner surface of the arc 72b1; when the relation is $R=0.5 \cdot D1$, the upper plate part 72b is formed as a hemispherical shape comprising substantially only the arc 72b1. When the relation is $0.3 \cdot D1 \leq R < 0.5 \cdot D1$, the upper plate part 72b is comprised of the arc 72b1 and a flat part 72b2 forming the top part of the upper plate part 72b, as shown in the present embodiment.

Figure 9:
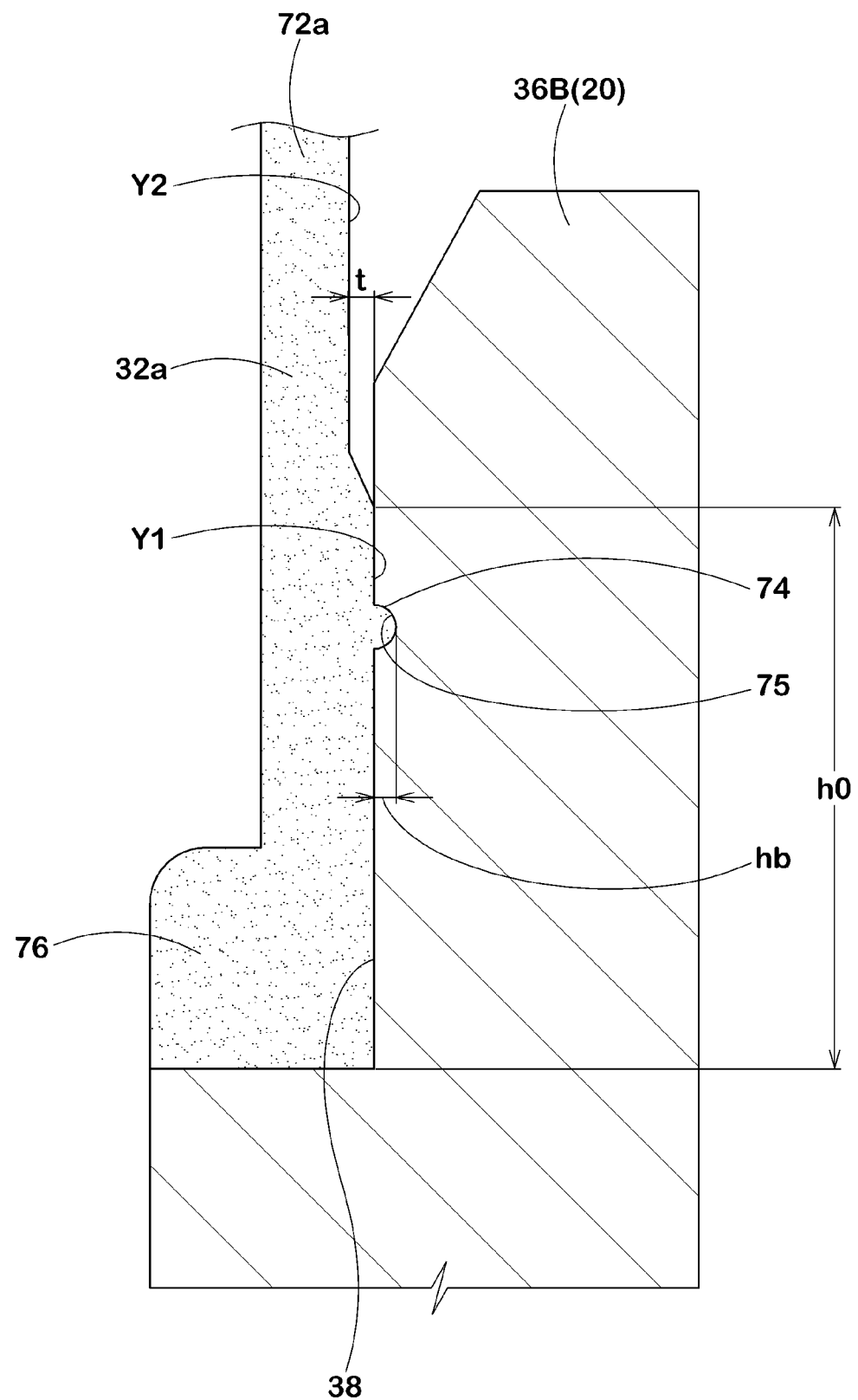
FIG. 9 A partial enlarged cross sectional view of a securing rib.

As shown in an enlarged drawing of FIG. 9 in the present embodiment, an inner circumferential surface of the trunk part 72a comprises a contact region Y1 being contactable with the inner cap connecting surface 38 and a region Y2 other than the contact region Y1. To define the contact region Y1 and to avoid contact of a portion except the contact region Y1 with the inner cap connecting surface 38, the region Y2 has a larger diameter having a difference (t) of not less than 0.2 mm, for example. This enables to keep the height h0 of the contact region Y1, which is a joint width with the boss part 36B of the trunk part 72a, in the size of the inner cap 34. In the contact region Y1, a semicircle cross-section securing rib 74 extends on the inner circumferential surface in the circumferential direction having a protruding height between 0.04 and 0.15 mm. The inner cap connecting surface 38 of the boss part 36B comprises an engagement groove 75 engaging with the securing rib 74. The lower end part of the trunk part 72a is provided with thick portion 76 extending on the outer circumferential surface of the trunk part 72a continuously in the circumferential direaction for reinforcement.

Figure 8:
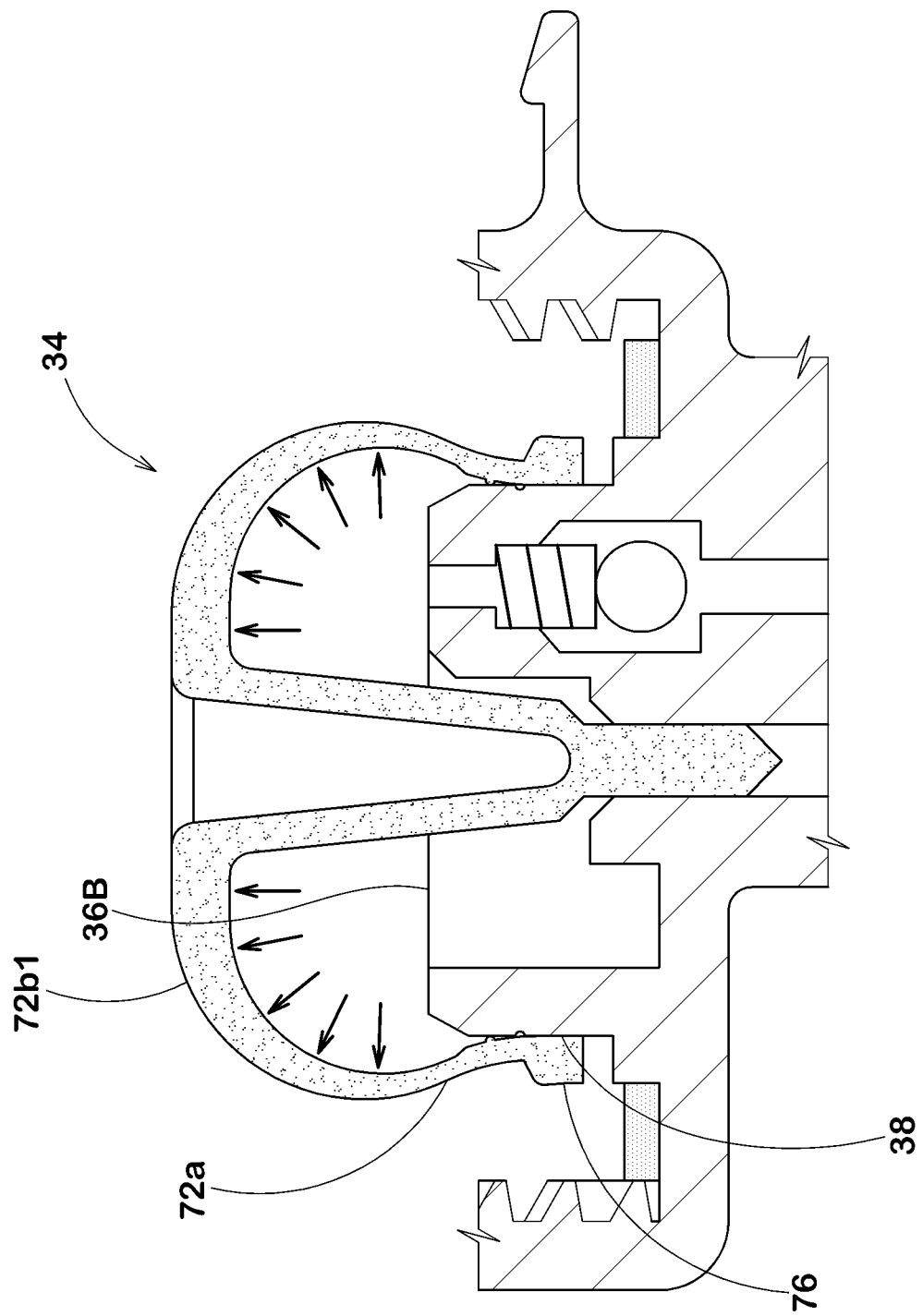
FIG. 8 A cross-sectional view showing a deformation of an inner cap caused by filling up compressed air.

When using such an inner cap 34 and when the compressed air is filled up in the inner cap main body 72, as shown exaggeratingly in FIG. 8, the inner cap 34 deforms and extends transversally from the arc 72b1 toward the upper end of the trunk part 72a, and the inner cap 34 tends not to be easily expanded transversally since the lower end of the trunk part 72a hooped by the thick portion 76. An interspace between the trunk part 72a and the inner cap connecting surface 38 tends not to occur at the time of compressed-air filling. Therefore, it can reduce a trouble of the inner cap 34 of unfastening from boss part 36B caused by the interspace. If the interspace occurs, the trouble occurs because the escaping air from the interspace increases the internal pressure of the bottle container 3, and a pressure difference between the compressed air and the internal pressure decreases. That is to say, it allows to work the compressed air properly.

In the experiment conducted by the present inventor, the inner cap 34 drops more easier when it is in a car and vibrated at a time of high-temperature (at 80 deg. C., for example); in a high-temperature vibration test under a temperature of 80 deg. C., a vibration frequency of 10 Hz, and a lateral acceleration of 5 G, for example, the inner cap 34 drops when the protruding height (hb) of the securing rib 74 is less than 0.04 mm, and the dropping possibly occurs when the protruding height (hb) is in a range of from not less than 0.04 mm to less than 0.08 mm.

However, at a low-temperature environment, the inner cap 34 becomes not to drop in an environment of −30 deg. C. when the protruding height (hb) is more than 0.15 mm and the compressed air of 350 kPa, for example; and the inner cap 34 becomes not to drop in an environment of −45 deg. C. when the protruding height (hb) is in a range of from not less than 0.12 mm to less than 0.15 mm. In order to work properly the inner cap 34, in the environment of between −45 and −80 deg. C., the protruding height (hb) is preferably is in a range of 0.08 to 0.12 mm; and in the environment of between −30 and a ordinarily temperature, the protruding height (hb) is enough in a range of from 0.04 to 0.15 mm. When a capability of the compressor 5 (the highest pressure) is high, it is possible to grow more the protruding height (hb) and to design not to drop the inner cap, no matter how vibration occurs.

The stop shaft 73 is a stepped shaft as shown in FIG. 7. The stop shaft 73 comprises a large-diameter main part 73A extending inferiorly from the upper plate part 72b, a stepped stopper 73B connecting to the lower end of the main part 73A, and a small-diameter intrusive part 73C intruding into the sealing agent/compressed air removal port 32a.

The stepped stopper 73B can abut on the upper end face part 20S (the upper end face 20aS of the first elevated portion 20a, in this embodiment) of the boss part 36B.

In the present embodiment, the main part 73A is a tapered shaft tapering inferiorly and is provided therein with a tapered-cone-shaped central hole 73H having an opening in the upper end. This central hole 73H makes a lateral expanse deformation of the arc 72b1 more likely as shown in FIG. 8 and provides moderately the main part 73A with flexibility, it makes possible to reduce a shifting of the core caused by the expanse deformation. And, the intrusive part 73C is a straight shaft having a substantially constant diameter. In the present embodiment, the intrusive part 73C is provided in a lower end part with a tapered guide part 73C1 to make easy the intrusion into the sealing agent/compressed air removal port 32a.

In this way, the stepped stop shaft 73 comprising the stopper 73B can keep the intruding thickness of the intrusive part 73C constant since the stopper 73B abuts on the upper end face 20aS when the stop shaft 73 intrudes into the sealing agent/compressed air removal port 32a. A connecting power variance between the stop shaft 73 and the sealing agent/compressed air removal port 32a therefore can become suppressed. Eventually, a comprehensive connecting power variance between the inner cap 34 and the boss part 36B can become suppressed, and it makes easy to dismount the inner cap 34.

In the present embodiment, the stopper 73B is formed as a sloping surface inclined inferiorly in a tapered manner. The upper end face 20aS includes an abutting surface part J having the same inclination as the stopper 73B. Incidentally, an angle θ with respect to the shaft center of the stopper 73B is preferably not less than 30 deg., more preferably not less than 45 deg., furthermore preferably not less than 60 deg. to fulfill a stopper function. And, the stopper 43B can be formed with a right-angled surface having the angle θ of 90 deg.

The height h0 of the contact region Y1 is preferably smaller than the height h1 of the intrusive part 73C. When the relation is $$h0 \geq h1,$$

the intrusive part 73C drops from the sealing agent/compressed air removal port 32a before dropping the trunk part 72a from the boss part 36B. The compressed air flows out therefore into the sealing agent/compressed air removal port 32a, and it is possible to incur danger of the inner cap 34 not being dismounted.

The intrusive part 73C preferably protrudes inferiorly over the lower end of the trunk part 72a. When assembling the cap unit 2 by applying the inner cap 34 for the boss part 36B and if the intrusive part 73C does not protrude inferiorly over lower end of the trunk body, the tip of the intrusive part 73C passes out of view, and it makes difficult to intrude into the sealing agent/compressed air removal port 32a; therefore, assembling work efficiency deteriorates.

The air intake port 31b of the cap main body 33 opens at the tip of a connection nozzle 55 connecting directly to the joint concave portion 54 disposed in the compressor 5.

Figure 10:
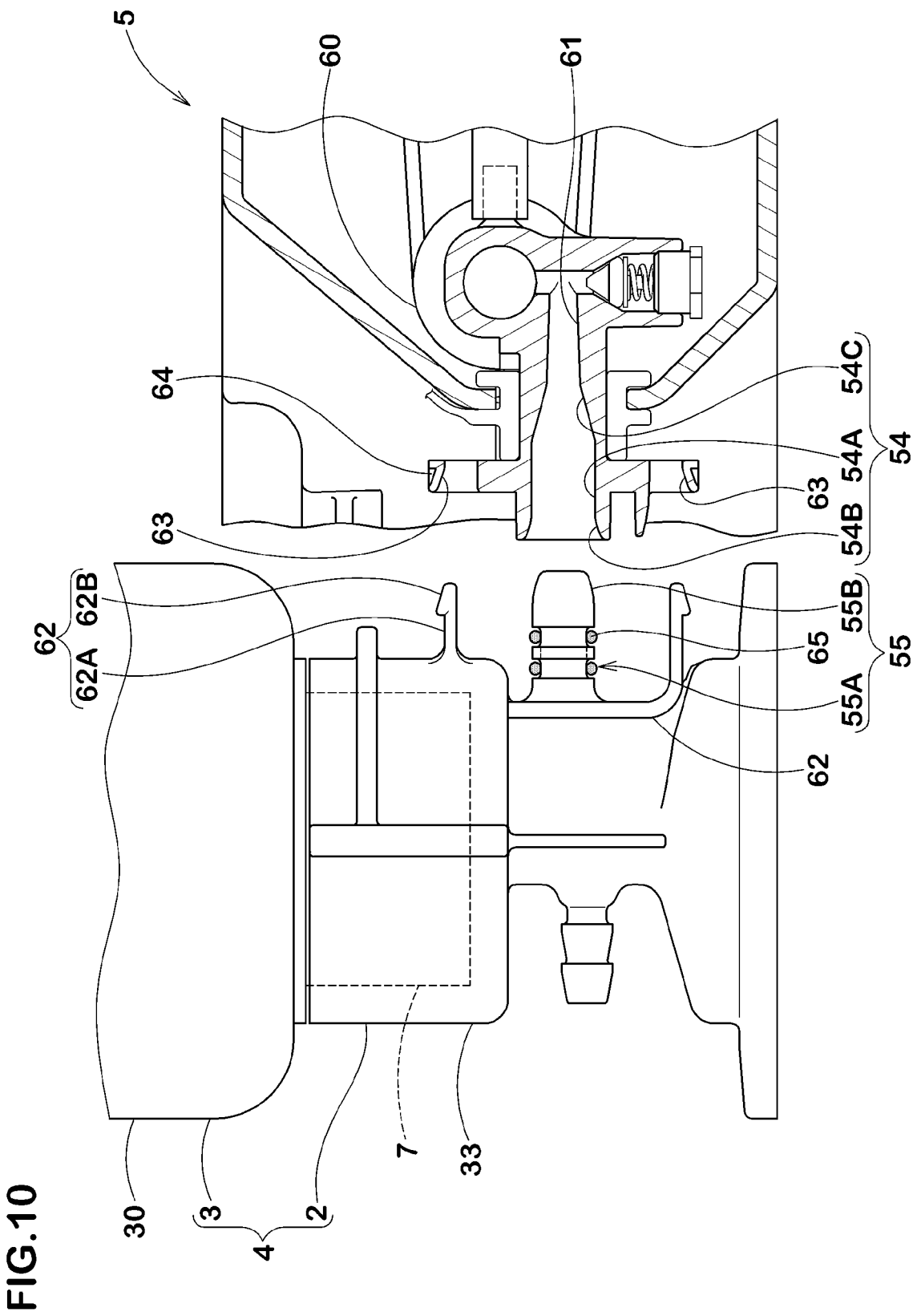
FIG. 10 A cross-sectional view showing a situation before connecting the cap unit with the compressor.
Figure 11:
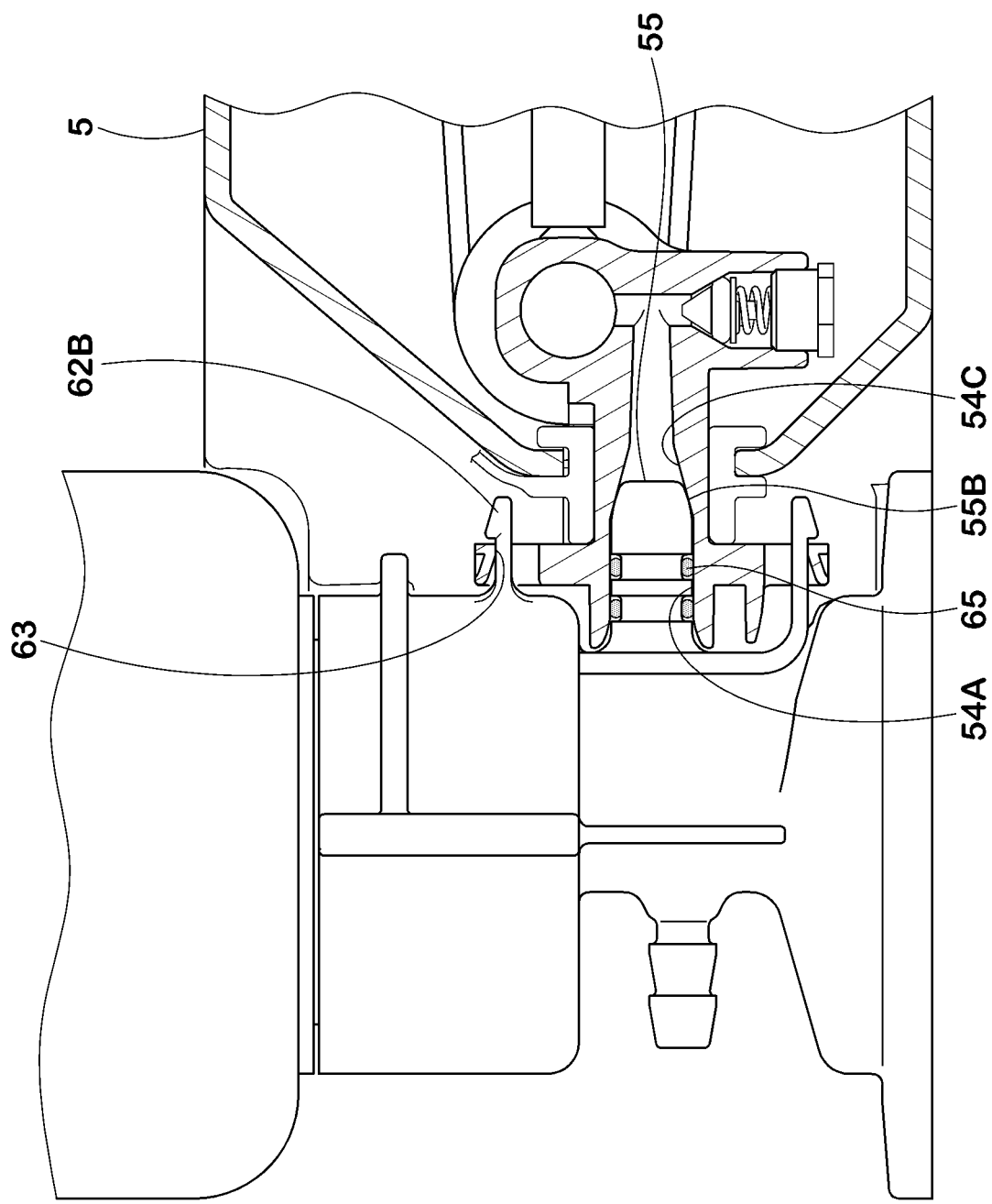
FIG. 11 A cross-sectional view showing a connected situation between the cap unit and the compressor.

As shown in FIGS. 10 and 11, the joint concave portion 54 disposed in the compressor 5 conducts a compressed air supply flow passage 61 extending from a cylinder pump 60 for compressing the air in the compressor 5. This joint concave portion 54 is provided continuously in the forward and backward of a parallel hole 54A having a constant inside diameter with a forward tapered surface part 54B and a backward tapered surface part 54C each forming a tapered cone shape toward the cylinder pump 60.

The connection nozzle 55 is provided in the tip end of the parallel nozzle main body 55A with a cone-shaped tapered surface part 55B. Around the nozzle main body 55A, an O-shaped ring 65 is arranged to seal an interspace between the inner circumferential surface of the joint concave portion 54 and the nozzle main body 55A. In the present embodiment, the O-shaped ring 65, a consumable supply, is disposed on the cap main body 33; therefore, the compressor 5 can be repeatedly used without maintenance.

The backward tapered surface part 54C of the joint concave portion 54 has substantially the same inclination as the tapered surface part 55B and serves as a receiving surface to retain concentrically the tapered surface part 55B when inserting the connection nozzle 55 into the joint concave portion 54.

The cap main body 33 is provided in both sides of the connection nozzle 55 (both upper and lower sides, in the present embodiment), with a pair of protruding locking clicks 62. The compressor 5 is provided at a position facing to the locking clicks 62 with click interlocking holes 63 to infix the compressor 5 and the bottle unit 4 in the directly connecting state by interlocking with the locking clicks 62.

Each of the locking click 62 is provided in the tip of the main part 62A extending parallel to the connection nozzle 55 from the cap main body 33 with a rectangular-triangle-shaped hooking part 62B protruding outward. The click interlocking hole 63 is a rectangle hole to have the locking click 62 therein, in the present embodiment, and in each of the upper and lower edges, the click interlocking hole 6 interlocks with the hooking part 62B to prevent from dropping. The locking click 62 and the cap main body 33 have a integrally formed body made of plastic such as nylon, polypropylene, polyethylene or of reinforced plastic containing short fiber such as fiberglass. The click interlocking hole 63 is formed with a frame 64 supported by the joint concave portion 54 in the present embodiment. The frame 64, the joint concave portion 54, and the cylinder pump 60 is formed as an integrally formed body made of light weight alloy such as zinc alloy and aluminum alloy, for example.

Although the especially preferred embodiments of the pneumatic tire and the method for manufacturing it in the present invention have been described in detail, needless to say, the invention is not limited to the above-mentioned concrete embodiments, and various modifications can be made.

The invention claimed is:

1. A cap unit attached to an opening of a bottle container containing a puncture sealing agent, and comprising a cap main body which comprises:
   an air flow passage to feed compressed air from a compressor into the bottle container through an air intake port, and
   a sealing agent/compressed air extractive flow passage to extract the puncture-sealing agent and the compressed air from the bottle container in succession by the feed of the compressed air; wherein
   said cap main body is provided in an upper end part of the cap main body with an opening-attaching concave part for inserting and fixing of said opening of the bottle container, and with a boss part projecting from a basal plane of the opening-attaching concave part;
   an upper end face part of said boss part comprises an air flow passage upper opening forming an upper end of said air flow passage, and a sealing agent/compressed air extractive flow passage upper opening forming an upper opening of the sealing agent/compressed air extractive flow passage;
   said air flow passage is provided with a reversed flow preventing device to prevent flow of the puncture-sealing agent toward a compressor;
   said air flow passage comprises
      a vertical flow passage extending downwardly from said air flow passage upper opening,
      a lateral flow passage extending laterally from said air intake port, and
      a connecting flow passage connecting them; and
   said cap main body comprises
      a vertical hole with steps, of which internal diameters increase downwardly in a stepwise manner, and the vertical hole including:
      a first vertical hole extending from said air flow passage upper opening,
      a second vertical hole leading toward the first vertical hole with a first step surface,
      a third vertical hole leading toward the second vertical hole with a second step surface, and
      a fourth vertical hole, leading toward the third vertical hole with a third step surface, having the lower end thereof opening in a basal plane of the cap main body, and being provided in a lower end part with a securing groove extending in the circumferential direction;
      said vertical flow passage is formed of said first to third vertical holes, and a valve seat case comprising said connecting flow passage is inserted from the lower end of the fourth vertical hole and kept therein;
   said reversed flow preventing device comprises
      a ring-shaped valve seat disposed in an upper end of the valve seat case and connecting said vertical flow passage with said connecting flow passage,
      a ball-shaped spherical valve inserted movably into said third vertical hole to open and close the valve seat, and
      a biasing spring disposed in said second vertical hole and biasing the spherical valve toward the valve seat; and
   said valve seat case is provided with a preventing dropping device to prevent dropping from the fourth vertical hole by an engagement with said securing groove.

2. The cap unit as set forth in claim 1, wherein
   said valve seat case comprises a column-shaped basal portion to be inserted into the fourth vertical hole; and
   said preventing dropping device comprises
   a central hole extending upwardly from a lower end of said basal portion along a shaft center and forming an annular peripheral wall around said central hole,
   a plurality of slits extending upwardly in radiating-manner from the lower end so as to divide the peripheral wall into plural circumferential fan-like pieces deformable elastically in the radial direction, and
   a circumferential securing rib protruded on an outer circumferential surface of each of the fan-shaped pieces and being engageable with the securing groove.

3. The cap unit as set forth in claim 1 or 2, wherein
   said valve seat case comprises the column-shaped basal portion inserted into the fourth vertical hole, and a valve seat junction concave portion disposed on an upper end of the basal portion to attach the valve seat; and
   said connecting flow passage is is L-shaped and comprises
      a vertical connecting flow passage opening in a basal plane of the valve seat junction concave portion and conducting said vertical flow passage, and
      a lateral connecting flow passage bent at the lower end of the vertical connecting flow passage, opening on an outer circumferential surface of the basal portion, and conducting said lateral flow passage.

4. The cap unit as set forth in claim 3, wherein said valve seat case is provided on both of the upper and lower sides of the opening of said lateral connecting flow passage with an O-shaped ring to seal an interspace between the valve seat case and the fourth vertical hole.

5. The cap unit as set forth in claim 1, wherein said valve seat case is despined inside the fourth vertical hole around the shaft center by a despining device.

* * * * *